(No Model.)
W. MARSHALL.
PRODUCTION AND DISTRIBUTION OF ELECTRICITY.
No. 472,379. Patented Apr. 5, 1892.
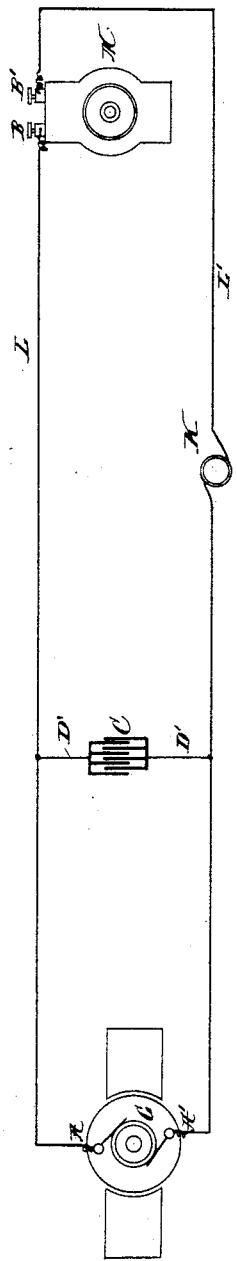
Attest
G. H. Botts
James Osborne
Inventor
William Marshall

UNITED STATES PATENT OFFICE.

WILLIAM MARSHALL, OF NEW YORK, N. Y.

PRODUCTION AND DISTRIBUTION OF ELECTRICITY.

SPECIFICATION forming part of Letters Patent No. 472,379, dated April 5, 1892.

Application filed November 23, 1889. Renewed September 3, 1891. Serial No. 404,604. (No model.)

*To all whom it may concern:*

Be it known that I, WILLIAM MARSHALL, a citizen of the United States, and a resident of the city, county, and State of New York, have invented certain new and useful Improvements in the Production and Distribution of Electricity, of which the following is a specification.

The main object of my invention is to distribute electrical energy intermittently with such rapidity as to cause the effects in the line to appear continuous and to provide special apparatus for this purpose. The apparatus can be used, however, with good effect for certain purposes where the alternations or current impulses on line are not so rapid as indicated. I accomplish this by connecting in multiple with the electric generator a condenser and a suitable translating device, such as an electric motor, and I provide means for simultaneously interrupting or partially interrupting the generator-current and charging the condenser and subsequently, but also simultaneously, throwing the currents of both the generator and condenser into line. The means for accomplishing the latter functions consist of an automatic continuously-operating circuit-changer, which is placed in the outgoing or incoming circuit beyond the point of connection for the condenser.

It is well known that the discharge of an electrical condenser is a reverse direction to the charge. Therefore it will be readily understood that when an electric condenser is connected in multiple with an electric generator the condenser-current and that of the generator will be in the same direction in the circuit outside the condenser. Consequently the strength of the current which passes intermittently through the circuit outside the condenser will be equal to that of the generator and condenser combined.

The drawing illustrates my invention diagrammatically.

G represents a dynamo-electric machine; A A', the two dynamo binding-posts; C, an electrical condenser; D D', the two poles thereof; M, an electric motor; B B', the two motor binding-posts, and K an automatic continually-operating circuit-changer placed in the circuit between the motor and the points from which the condenser-circuit is led off.

L represents one side of the line connected to a binding-post on the generator and another on the motor. L' is the opposite side of the line connected to the remaining binding-posts of the generator and motor.

In place of the dynamo I may use any suitable source of electrical energy or any other suitable translating device in place of the motor. The circuit-changer which I prefer to use is an automatic circuit-breaker which rapidly breaks and makes the electric circuit; but I may use any apparatus which causes sufficient variations in the resistance of the circuit to admit of the alternate charge and discharge of the condenser.

The invention is especially valuable in connection with electric street-car traction, and it is particularly adapted to systems in which each car carries an independent supply of electricity, only half the amount of current being necessary when the condenser is used as when the generator is used alone. This causes an immense saving in price, weight, and space, as well as requiring the attendant in charge to take care of only about half the quantity of electrical apparatus and keep it in repair. A perfect condenser never calls for repairs. It remains always in the same condition. The condenser can also be used to advantage in systems where the current is supplied to the translating devices through conductors from a central station. In this case it is preferable to have a condenser on each car, as the less the resistance of the circuit between the condenser and the motor the better the result.

A condenser can be made so perfect that it will charge and discharge instantaneously. Thus it will be readily understood that with a suitable rapid circuit-changer a practically continuous current may be obtained from the system above described.

Having now described my invention, I claim—

1. The method of distributing electrical energy from an electric source, which consists in alternately charging an electrical condenser from the said electric source and throwing into the line beyond the condenser the currents of both the condenser and the electric source, these acts being performed with such rapidity as to make the effects in the line appear continuous, as set forth.

2. The combination, with an electric source, of an electrical condenser and one or more translating devices, the said condenser and the said translating device or the said condenser and one or more of the said translating devices being arranged in multiple, and a continuously-operating circuit-changer between the condenser and the translating device or devices, as and for the purpose set forth.

Signed at New York, in the county of New York and State of New York, this 21st day of November, A. D. 1889.

WILLIAM MARSHALL.

Witnesses:
    JOHN E. ROSS,
    JAS. GREGORY.